United States Patent
Lowry

(10) Patent No.: US 7,065,834 B2
(45) Date of Patent: Jun. 27, 2006

(54) BISTABLE HINGE WITH DAMPENING MECHANISM

(75) Inventor: David A. Lowry, Wayne, PA (US)

(73) Assignee: Southco, Inc., Concordville, PA (US)

( * ) Notice: Subject to any disclaimer, the term of this patent is extended or adjusted under 35 U.S.C. 154(b) by 0 days.

(21) Appl. No.: 10/864,662

(22) Filed: Jun. 9, 2004

(65) Prior Publication Data

US 2004/0261220 A1    Dec. 30, 2004

Related U.S. Application Data

(60) Provisional application No. 60/477,073, filed on Jun. 9, 2003, provisional application No. 60/496,827, filed on Aug. 21, 2003.

(51) Int. Cl.
*E05F 1/08*    (2006.01)

(52) U.S. Cl. .............. 16/330; 16/303; 16/331; 16/334; 379/433.13

(58) Field of Classification Search .......... 16/330, 16/303, 329, 342, 273, 274, 50, 54; 455/575.1, 455/575.4, 575.8, 550.1, 90.3; 379/433.12, 379/433.13; 188/290–296, 307–308, 318
See application file for complete search history.

(56) References Cited

U.S. PATENT DOCUMENTS

| | | | |
|---|---|---|---|
| 571,133 A | 11/1896 | Hoffman | |
| 3,401,422 A | 9/1968 | Ventura | |
| 3,975,794 A | 8/1976 | Kaiser et al. | |
| 4,489,974 A | 12/1984 | Warhol | |
| 5,109,571 A * | 5/1992 | Ohshima et al. | 16/307 |
| 5,111,503 A | 5/1992 | Takagi | |
| 5,138,743 A | 8/1992 | Hoffman | |
| 5,257,310 A | 10/1993 | Takagi et al. | |
| 5,276,945 A | 1/1994 | Matsumura | |
| 5,419,013 A * | 5/1995 | Hsiao | 16/319 |
| 5,491,874 A | 2/1996 | Lowry et al. | |
| 5,600,868 A | 2/1997 | Tourville et al. | |
| 5,628,089 A | 5/1997 | Wilcox et al. | |
| 5,629,979 A | 5/1997 | Domoleczny | |
| 5,664,286 A * | 9/1997 | Sorimachi | 16/54 |
| 5,682,644 A | 11/1997 | Bohacik et al. | |
| 5,697,124 A | 12/1997 | Jung | |
| 5,715,576 A | 2/1998 | Liu | |

(Continued)

FOREIGN PATENT DOCUMENTS

DE    2226739 A  *  12/1973

(Continued)

OTHER PUBLICATIONS

Certified English translation of Japanese Patent Application No. 2002-310132A.

*Primary Examiner*—Chuck Y. Mah
(74) *Attorney, Agent, or Firm*—Paul & Paul

(57) ABSTRACT

A hinge for controlling a pivotal rate of movement. The hinge includes a first hinge part and a second hinge part that is pivotally mounted to the first hinge part. The first hinge part movable to and between open and closed positions relative to the second hinge part. A connector extends along an axis and the first and second hinge parts are pivotally mounted around the connector on the axis. A gap is defined between at least one of the first and second hinge parts and the connector. A damping fluid is located within the gap for controlling a relative rate of movement of the first and second hinge parts between the open and closed positions.

5 Claims, 6 Drawing Sheets

U.S. PATENT DOCUMENTS

| | | | |
|---|---|---|---|
| 5,724,683 A | 3/1998 | Sorimachi et al. | |
| 5,752,293 A | 5/1998 | Lowry et al. | |
| 5,848,152 A | 12/1998 | Slipy et al. | |
| 5,867,866 A * | 2/1999 | Chen et al. | 16/50 |
| 5,923,751 A | 7/1999 | Ohtsuka et al. | |
| 5,937,062 A | 8/1999 | Sun et al. | |
| 5,975,195 A | 11/1999 | Lowry et al. | |
| 5,996,132 A * | 12/1999 | Sorimachi | 4/236 |
| 6,052,869 A * | 4/2000 | Suzuki | 16/341 |
| 6,065,187 A * | 5/2000 | Mischenko | 16/341 |
| 6,070,298 A * | 6/2000 | Sorimachi | 16/330 |
| 6,085,384 A * | 7/2000 | Bivens | 16/54 |
| 6,115,886 A * | 9/2000 | Fujita | 16/330 |
| 6,122,801 A | 9/2000 | Reichert et al. | |
| 6,141,831 A | 11/2000 | Novin et al. | |
| 6,178,597 B1 * | 1/2001 | Suzuki et al. | 16/330 |
| 6,182,330 B1 | 2/2001 | Novin et al. | |
| 6,195,431 B1 * | 2/2001 | Middleton | 379/433.13 |
| 6,249,426 B1 | 6/2001 | O'Neal et al. | |
| 6,336,252 B1 * | 1/2002 | Bando | 16/307 |
| 6,389,611 B1 * | 5/2002 | Fujita | 4/236 |
| 6,459,887 B1 | 10/2002 | Okuda | |
| 6,543,088 B1 * | 4/2003 | Koshikawa | 16/303 |
| 6,634,061 B1 | 10/2003 | Maynard | |
| 6,658,111 B1 * | 12/2003 | Nagashima | 379/433.13 |
| 6,785,936 B1 * | 9/2004 | Koshikawa | 16/328 |
| 2002/0198016 A1 | 12/2002 | Gupte | |

FOREIGN PATENT DOCUMENTS

| | | | |
|---|---|---|---|
| EP | 1331343 A2 * | 7/2003 | |
| JP | 04228939 A * | 8/1992 | |
| JP | 07158665 A * | 6/1995 | |
| JP | 2002310132 A * | 10/2002 | |
| JP | 2004138244 A * | 5/2004 | |

* cited by examiner

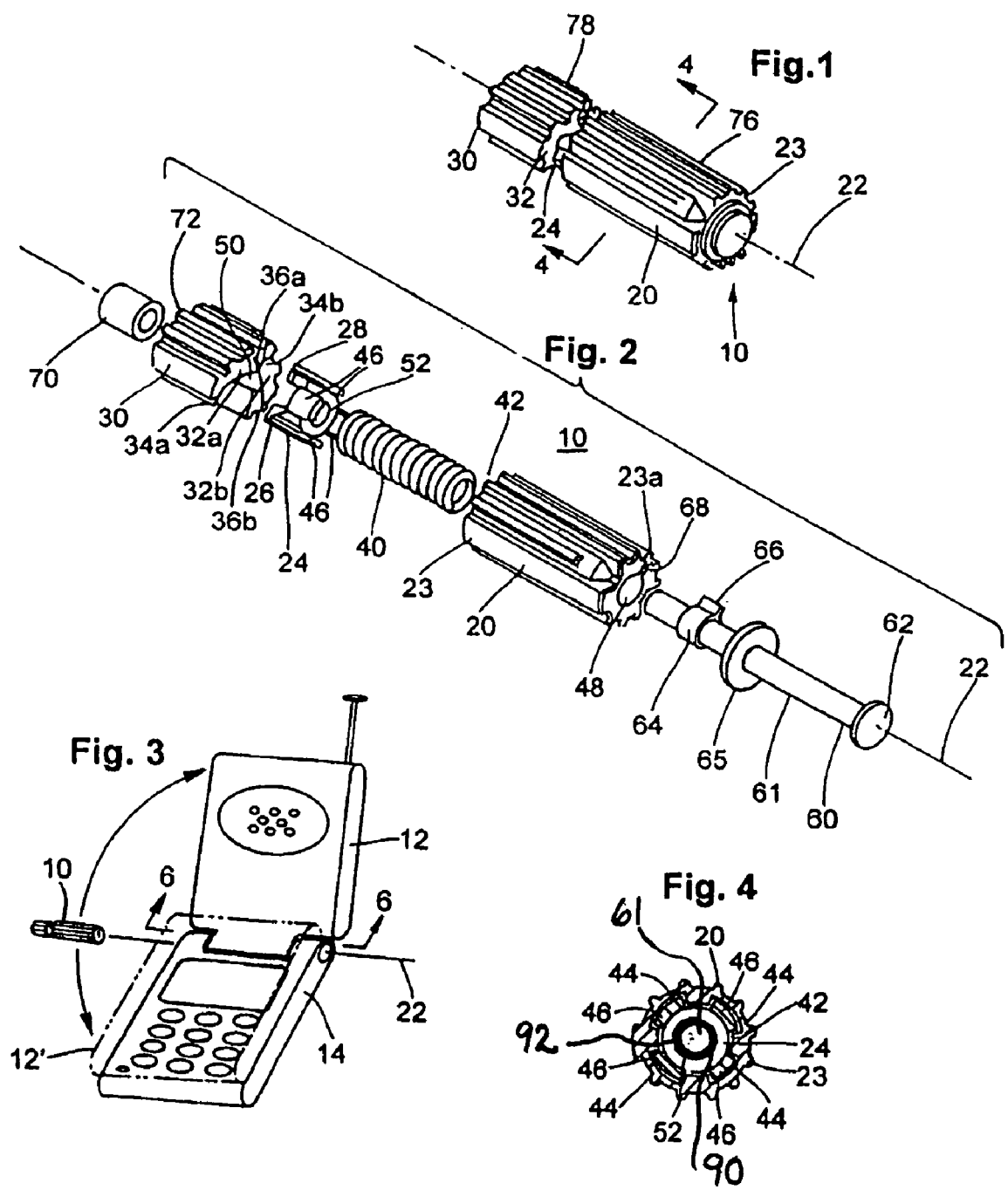

BISTABLE HINGE WITH DAMPENING MECHANISM

CROSS-REFERENCE TO RELATED APPLICATIONS

This application claims the benefit of U.S. Provisional Patent Application Nos. 60/477,073, filed Jun. 9, 2003 and 60/496,827, filed Aug. 21, 2003, each entitled, "Bistable Hinge with Dampening Mechanism".

BACKGROUND OF THE INVENTION

The present invention relates to a hinge assembly for rotatably coupling a hinged member to a device housing, and more particularly, to a position holding, viscoelastic dampened, self-latching hinge for holding a hinged member in one of an open position and a closed position relative to a device housing.

In certain hinge applications, it is desirable to provide a hinge which can maintain a hinged member in an open position or a closed position and dampen movement of the hinged member between the open and closed positions at a relatively slow and constant rate. One such application is in the highly competitive field of portable communication devices, (e.g., cellular and PCS phones or light weight covers in automobiles). The fierce competition among portable communication devices has created a premium on improvements to these devices that make them more marketable, with a particular emphasis on styling and aesthetics.

In some devices, a spring bias member is typically installed between the hinged member and the device housing which biases the hinged element to the open position after an initial latching force is manually overcome or after a separate manual latch is released. However, the known hinge assemblies are provided in multiple pieces which are assembled in situ with the hinged member and the device housing. This type of known hinge imparts an axial force on the device housing and the hinged member and is costly to produce. While this additional loading can be accommodated for in the design of certain types of devices which have a sufficient size to provide the necessary load path, in the field of portable communication devices where the trend is to produce smaller and smaller phone devices, the use of this type of hinge assembly can result in premature fatigue and structural failure of the mounting provisions for the hinge in the device housing and/or hinged member. In addition, these known hinge assemblies tend to have an abrupt opening action, effectively slamming the flip half of the phone against the rear stop as the opening motion is completed.

In another known hinge which was designed to address the axial loading problem, a preassembled hinge is provided which can hold a hinged member in an open position or a closed position. The hinge includes an outer shell which reacts to the axial spring load such that no axial force is imparted on the device housing or the hinged member. However, this construction is bulky, and cannot be installed between the device housing and the hinged member with a simple manufacturing operation. Additionally, the hinged member is not held stably in the open position since the closing and opening forces of the hinge are the same. In the open position, the spring force on the hinge which acts to maintain the hinge in the open position is lower than when the hinge is in the closed position and, accordingly, the hinged member is subject to movement or chatter while in the open position. This can cause premature wear of the hinge as well as the device housing and the hinged member which are connected by the hinge. Moreover, movement of the hinged member between the closed and open position in many devices is unregulated, resulting in undesirable residual forces when moved to the open position, as well as premature wear and/or failure of the hinge. This type of hinge also has the slamming problem mentioned in the previous paragraph.

The present invention provides a relatively inexpensive preassembled, self-contained, two position hinge which can hold a hinged member in a first, open position or a second, closed position relative to a device housing without imparting an axial load on the hinged member or the device housing thereby resulting in long operating life and allows the hinged member to move at a relatively constant speed between the open and closed positions. This imparts a sense of high quality and elegance to the motion of the flip half of the phone or automotive cover. The hinge of the present invention can be simply and easily connected to the hinged member and the device housing without tools and with mere finger pressure, thereby yielding reduced assembly cost of the final product.

BRIEF SUMMARY OF THE INVENTION

Briefly stated, a hinge according to one aspect of the present invention includes a first hinge part for connection to one of a hinged member and device housing and a second hinge part adapted for connection to the other of the hinged member and the device housing. The first hinge part has an axis and a cam follower while the second hinge part has a cam surface. An axial load bearing connector extends through axial bores of the first and second hinge parts. The cam follower is urged against the cam surface under bias force from a spring or the like. A viscoelastic fluid is located within the axial bores between the inner surface of at least one of the first and second hinge parts and the outer surface of the axial load bearing connector. The viscoelastic fluid dampens the spring force that urges the cam follower against the cam surface to thereby regulate movement of the cam follower against the cam surface under the bias force and thus regulate the opening and/or closing speed of the hinged member with respect to the device housing.

According to a further aspect of the invention, a hinge is adapted to pivotably connect a hinged member to a device housing to maintain the hinged member in one of an open position and a closed position relative to the device housing and to rotate between the opened and closed positions at a relatively constant speed. The hinge includes a first hinge part having an axis and a cam follower. The first hinge part is adapted to be connected to one of the hinged member and the device housing. A second hinge part is provided which is aligned with and rotatable about the axis of the first hinge part. The second hinge part has a cam surface. The cam follower on the first hinge part contacts the cam surface. The cam surface has a first position and a second position. The second hinge part is adapted to be connected to the other of the hinged member and the device housing. A spring urges the cam follower against the cam surface with an axial spring force while an axial load bearing connector connects the first and second hinge parts in which the spring force is reacted. A viscoelastic fluid is located inside a gap between at least one of the inner surfaces of the axial bores between and the outer surface of the axial load bearing connector. The viscoelastic fluid dampens the spring force that urges the cam follower against the cam surface, thereby resulting in slower travel of the cam follower against the cam surface, and thus slowed, generally constant velocity rotational motion of the hinge. The hinge is adapted to hold the hinged member in an open position relative to the device housing when the cam follower is in the first position. A torque element is located between the first and second hinge parts. The torque element has a higher friction torque in a first rotational direction of the first hinge part relative to the second hinge part than in a second rotational direction of the first hinge part relative to the second hinge part, which is adapted to maintain the hinged member in a generally stable state in the first position.

According to a further aspect of the present invention, a method of assembling a hinged member to a device housing includes providing a preassembled hinge which includes a first hinge part with a first outer shape, a second hinge part with a second outer shape providing one of a hinged member and a device housing with a first bore located along a hinge axis, the first bore being complementary to and engagable by the first outer shape of the first hinge part, providing the other of the hinged member and the device housing with a second bore located along the hinge axis which is complementary to and engagable by the second outer shape of the second hinge part, the second bore being of sufficient size to allow the first hinge part to pass therethrough, aligning the hinged member and the device housing such that the first and second bores are axially aligned, inserting the first hinge part through the second bore and into the first bore such that the first outer shape of the first hinge part engages in the first bore and the second outer shape of the second hinge part engages in the second bore, providing a viscoelastic fluid inside the axial bores of the first and second hinge parts between the inner surface of the first and second hinge parts and the outer surface of the axial load bearing connector along a length of the hinge parts.

According to a further aspect of the invention, a method of assembling a hinge include providing a pin having first and second ends, the first end including a head and the second end having a first diameter, placing a first hinge part having an axial bore defined therethrough on the pin, the first hinge part including a cam follower, placing a second hinge part having a second axial bore defined therethrough on the pin, the second hinge part being rotatable about an axis of the first hinge part, the second hinge part having a cam surface, the cam follower on the first hinge part contacting the cam surface, the second hinge part including a counter bore of a second diameter aligned with the axial bore on an opposite side from the cam surface such that the second end of the pin extends into the counter bore, inserting a viscoelastic fluid inside the axial bores of the first and second hinge parts between the inner surface of the first and second hinge parts and the outer surface of the pin, so that the fluid is provided in the gap between the inner surfaces of the hinge parts and the outer surface of the axial load bearing connector along the full length of the hinge parts and extending through the axial range of motion of the first hinge part, and pressing a bushing onto the second end of the pin and into the counter bore, the bushing having an inside diameter which is smaller than the first diameter, and an outer diameter which is smaller than the second diameter, the bushing expanding as it is pressed onto the pin creating an interference fit between the outer diameter and the bushing.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the present invention, there is shown in the drawings embodiments which are presently preferred. It will be understood, however, that the invention is not limited to the precise arrangements and instrumentalities shown.

In the drawings:

FIG. 1 is a perspective view of a first preferred embodiment of a hinge in accordance with the present invention;

FIG. 2 is an exploded perspective view of the hinge shown in FIG. 1;

FIG. 3 is a perspective view of the hinge shown in FIG. 1 being installed in a foldable telephone device;

FIG. 4 is a cross-sectional view through the hinge shown in FIG. 1 taken along lines 4—4 in FIG. 1;

DETAILED DESCRIPTION OF THE INVENTION

Figure 6:
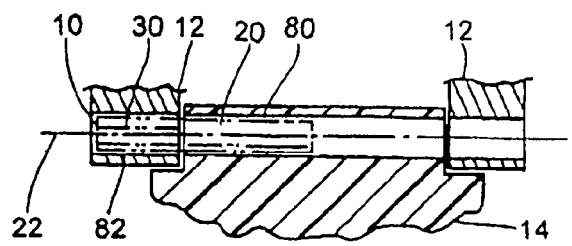
FIG. 6 is an enlarged partial cross-sectional view through the telephone device shown in FIG. 3 taken along lines 6—6 in FIG. 3 showing the opening for installing the hinge.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the hinges in accordance with the present invention and designated parts thereof. The terminology includes the words above specifically mentioned, derivatives thereof and words of similar import.

Referring now to FIGS. 1–3, there is shown a hinge 10 in accordance with a first preferred embodiment of the present invention. As shown in FIG. 3, the hinge 10 is adapted to connect a hinged member 12 to a device housing 14, for example on a cellular or radio telephone housing, with the hinged member 12 being one of a microphone or speaker holding member which is pivotally connected to the cellular telephone housing 14. The hinge 10 is adapted to maintain the hinged member 12 in one of an open position, as shown in FIG. 3, and a closed position (shown in phantom lines 12' in FIG. 3) relative to the device housing 14. The hinge 10 is further adapted to provide for a relatively constant rate of motion between the open and closed positions. For the device shown in FIG. 3, in the closed position the hinged member 12 is in facing engagement with the device housing 14. One having ordinary skill in the art will realize that the hinge 10 is not limited to cellular or radio telephone applications and may be utilized in any number of applications where a first member is pivotally mounted to a second member. For example, the hinge 10 may be utilized with an automobile door, a home door, a printer lid, an appliance lid, a container cap or in other like applications.

As shown in FIGS. 1 and 2, the hinge 10 includes a first hinge part 20 having a longitudinal axis 22 and a cam follower 24. The first hinge part 20 is adapted to be connected to one of the hinged member 12 and the device housing 14, and is preferably adapted to be connected to the hinged member 12. Preferably, the first hinge part 20 includes a separate housing 23 in which the cam follower 24 is movably located, as explained in detail below. However, it will be recognized by those skilled in the art from the present disclosure that the first hinge part 20 can be formed as a unitary piece with the cam follower 24, as will be explained in connection with the second embodiment of the invention described in detail below.

The hinge 10 also includes a second hinge part 30 which is aligned with and rotatable about the axis 22 of the first hinge part 20. The second hinge part 30 includes a cam surface 32 on an end surface thereof. The cam follower 24 of the first hinge part 20 contacts the cam surface 32, as shown in FIG. 1. In a preferred embodiment, the second hinge part 30 includes two cam surfaces 32*a*, 32*b*, shown most clearly in FIGS. 2 and 5. Each cam surface 32*a*, 32*b* includes a first position 34 and a second position 36. However, it will be recognized by those skilled in the art from the present disclosure that only a single cam surface 32 is required, and that if an opening angle of approximately 180° or more is desired, only a single cam surface 32 and cam follower contact can be used.

A spring 40 is provided which urges the cam follower 24 against the cam surface 32 with a spring force, as described in more detail hereinafter. The spring 40 is seated against an end surface 23*a* of the housing 23. Preferably, the spring 40 is a compression coil spring. However, other types of springs, such as disc springs or any other suitable spring may be used, if desired.

As shown in FIG. 2, the cam follower 24 preferably includes two contacts 26, 28 for following each cam surface 32*a*, 32*b*, respectively. The housing 23 of the first hinge part 20 includes an axially disposed chamber 42 defined therein. The spring 40 is located in the chamber 42, and the cam follower 24 is also slidably located in the chamber 42 in contact with the spring 40 such that the spring 40 applies the spring force on the cam follower 24 toward the cam surface 32 while allowing the cam follower 24 to move axially in the first hinge part 20.

Preferably, the housing 23 includes an axial guide structure 44, as shown in FIG. 4, and the cam follower 24 includes a complementary axial alignment structure 46, such that the cam follower 24 is restrained from rotational movement relative to the housing 23 of the first hinged part 20 but is allowed to reciprocate within the housing 23. Preferably, the axial alignment structure 46 on the cam follower 24 takes the form of protrusions which extend radially from opposite sides of the cam follower 24 which are received in axially extending grooves in the housing 23 of the first hinge part 20 which form the axial guide structure 44.

As shown in FIGS. 2 and 4, the first and second hinge parts 20, 30 each have an axial bore 48, 50, respectively, defined therethrough. Preferably, the cam follower 24 also includes an axial bore 52 defined therethrough as shown in detail in FIGS. 2 and 4. An axial load bearing connector 60 extends through the axial bores 48, 50, 52 to connect the first and second hinge parts 20, 30 together. The force of the spring 40 is reacted in the axial load bearing connector 60 such that no axial load is imparted by the hinge assembly 10 to the hinged member 12 or device housing 14 after it is assembled with the device.

As best shown in FIG. 2, the axial load bearing connector 60 is preferably in the form of a pin 61 which includes first and second ends. A head 62 is located on the first end. One of the first and second hinge parts 20, 30, and preferably the second hinge part 30, is connected to the second end. A torque element 64 is located on the pin 61 and connected to the other of the first and second hinge parts 20, 30, and preferably to the first hinge part 20, via an extension 66 on the torque element 64 being engaged in a slot 68 on the first hinge part 20. The torque element 64 has a higher friction torque in a first rotational direction of the pin 61 than in a second rotational direction of the pin 61. This means that a higher torque is required to rotate the first hinge part 20 relative to the second hinge part 30 as the first hinged part 20 is rotated in a first, closing direction (namely clockwise in FIGS. 1–3) relative to the second hinge part 30 and requires less torque to rotate the first hinge part 20 in a second, opening direction (counter clockwise in FIGS. 1–3) relative to the second hinge part 30. The use of the torque element 64 between the first and second hinge parts 20, 30 is used to maintain the hinged member 12 in a stable state in the first, open position since the hinge 10 is oriented such that a higher torque is required to initially close the hinged member 12 from the open position relative to the device housing 14 than is required to open the hinged member 12 from the closed position.

The torque element 64 is preferably of the type which is constructed of substantially uniform strength described in applicant's U.S. Pat. No. 5,491,874, which is incorporated herein by reference as if fully set forth. However, it will be recognized by those skilled in the art from the present disclosure that other types of torque elements can be used, if desired, such as torque elements which do not have uniform strength.

Still with reference to FIG. 2, the connection between the pin 61 and the second hinge part 30 is preferably accomplished with a press fit bushing 70. The press fit bushing 70 has an inside diameter which is slightly smaller than the outside diameter of the pin 61 and an outside diameter which is slightly smaller than the inside diameter of a bushing receiving bore 72 located in the second hinge part 30. After all of the elements of the hinge 10 are assembled on the pin 61, as shown in FIG. 2, the press fit bushing 70 is pressed onto the second end of the pin 61 at the same time as it is pressed into the bore 72 in the second hinge part 30. As the bushing 70 expands over the second end of the pin 61, it contacts the inside diameter of the bore 72 forming the connection between the second end of the pin 61 and the second hinge part 30, such that the pin 61 is firmly connected to and rotates with the second hinge part 30 during movement relative to the first hinge part 20. However, it will be recognized by those skilled in the art from the present disclosure that other types of connections, such as welding or mechanical deformation of the second end of the pin 61 or any other suitable connecting means may be used to connect the second end of the pin 61 to the second hinge part 30. Alternatively, the pin 61 can be formed as part of the second hinge part 30, and the head 62 can be formed on the first end after assembly of the hinge elements on the pin 61.

As shown in FIG. 4, a viscoelastic damping fluid 90 is located in a gap 92 between the inner surfaces of the hinge parts 20, 30 and the outer surface of the axial load bearing connector 60 to dampen relative movement between the hinge parts 20, 30 and the connector 60 of the hinge 10, and thus opening and closing movement of the hinged member 12 with respect to the device housing 14. Preferably, the fluid 90 is located in the gap 92 throughout the full length of the hinge parts 20, 30 and throughout the axial range of motion of the first hinge part 20. However, the fluid 90 could be located between just one of the hinge parts 20, 30 and the pin 61 without departing from the spirit and scope of the invention. The dampening provided by the fluid 90 in concert with the spring force from the spring 40 operate similarly to a spring in series with a dashpot. The combination serves to control the rate of the hinge rotation, maintaining it at a relatively constant speed. A suitable dampening fluid 90 is preferably in the form of a shear-stable grease based on synthetic hydrocarbon fluids, such as NYE Ultra Heavy Damping NYOGEL PG-44A provided by NYE Lubricants of Fairhaven, Mass. The gap 92 between the inner surfaces of the hinge parts 20, 30 and the outer surface of the axial load bearing connector 60 is preferably sized to obtain maximum dampening from the fluid 90. It will be understood that various viscoelastic materials may be used and that the gap dimensions may vary over a wide range to provide various dampening and motion control effects between the hinged member 12 and the device housing 14.

With reference to FIGS. 2 and 4, in order to assemble the hinge 10, the first hinge part 20 is placed on the pin 61. Preferably, a washer 65 and the torque element 64 are installed on the pin 61 prior to the first hinge part 20 being installed on the pin 61. The first hinge part 20 includes the housing 23 in which the spring 40 and cam follower 24 are nested. The second hinge part 30 is placed over the pin 61 such that the second hinge part 30 is rotatable about the axis 22 of the first hinge part with the cam surface 32 contacting the cam follower 24. The viscoelastic fluid 90 is inserted in the gap 92 between the axial load bearing connector 60 outer surface and the inner surfaces 54, 56 of the hinge parts throughout the length of the hinge parts 20, 30 and their range of motion. The press fit bushing 70 is then pressed over the second end of the pin 61 and into the bushing receiving bore 72.

Referring now to FIGS. 1, 3 and 6, the hinge 10 is assembled with the hinged member 12 and the device housing 14 using a simple assembly operation. As shown in FIG. 1, preferably, the first hinge part 20 of the hinge 10 includes a first outer shape 76 and the second hinge part 30 includes a second outer shape 78. As shown in FIG. 6, one of the hinged member 12 and the device housing 14, and preferably the device housing 14, is provided with a first bore 80 located along the hinge axis 22. The first bore 80 is complementary to and engagable by the first outer shape 76 of the first hinge part 20. The other of the hinged member 12 and the device housing 14, preferably the hinged member 12, is provided with a second bore 82 located along the hinge axis 22 which is complementary to and engagable by the second outer shape 78 of the second hinge part 30. The second bore 82 is of sufficient size to allow the first hinge part 20 to pass therethrough. After aligning the hinged member 12 and the device housing 14 such that the first and second bores are axially aligned, the hinge 10 is inserted from outside of the hinged member 12 and device housing 14, with the first hinge part 20 passing through the second bore 82 and into the first bore 80 such that the first outer shape 76 of the first hinge part 20 engages in the first bore 80. The second outer shape 78 of the second hinge part 30 engages in the second bore 82 as the hinge 10 is pressed into position, as shown in FIG. 6. This operation allows for simple and efficient assembly of a hinged member 12 to a device housing 14. A pivotable connection (not shown) can be provided on the opposite side of the device housing 14 from the hinge 10 of the present invention in order to further stabilize the hinged connection.

Preferably, the first and second hinge parts 20, 30, are provided with an outside generally frusto-conical taper extending from the second hinge part 30 to the first hinge part 20 and a plurality of radially outwardly extending ribs which engage in the complementarily configured bores 80, 82 in the device housing 14 and hinged member 12, respectively. The axially extending ribs, best shown in FIG. 4, grip the bores and provide a firm connection between the first hinge part 20 and the device housing 14 and the second hinge part 30 and the hinged member 12.

Figure 5:
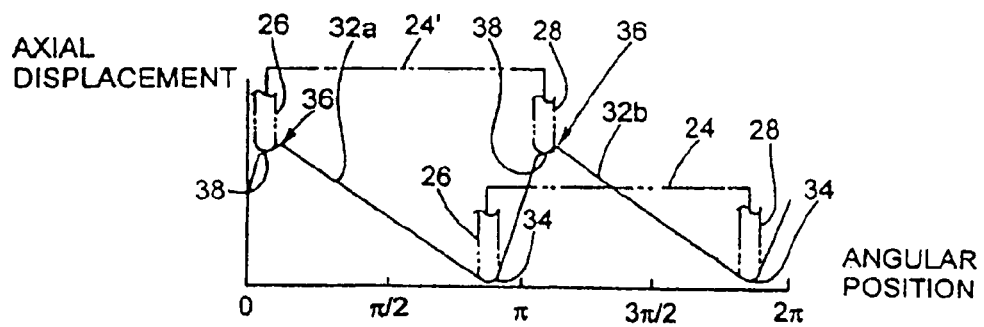
FIG. 5 is a graph showing the change in axial displacement of the cam surface with respect to angular position for the hinge in accordance with the first preferred embodiment of the invention shown in FIG. 1.

Referring now to FIG. 5, a graph showing the change in axial displacement of the cam surfaces 32a, 32b with respect to angular position about the axis 22 is provided. For the purposes of illustration, both contacts 26, 28 of the cam follower 24 have been shown displaced 180° from each other. In an open position, the contacts 26, 28 of the cam follower 24 are in the first position 34 of the respective cam surfaces 32a, 32b. The spring 40 applies less force on the cam follower 24 in the first position 34 than when the cam follower 24 is in the second position 36 since it is not as compressed. The second position 36 is an uppermost position on cam profiles 32a, 32b. The cam surfaces 32a, 32b also include a third, intermediate position 38 which is axially offset from the first and second positions 34, 36. The intermediate position 38 preferably comprises a short shelf which is offset slightly from the second, uppermost position 36 and is adapted to hold the hinged member 12 in a closed position relative to the device housing 14 when the cam follower 24 moves from the first position 34, past the second position 36 where the maximum spring force must be overcome, and to the third position 38, as represented by 24' in FIG. 5. The dampening provided by the viscoelastic fluid 90 in the gap 92 slows the motion between each of the cam positions, in particular when the cam follower moves from the second position to the first position, corresponding to the hinged member moving from the closed to the open position. The cam follower 24 must always move past the uppermost positions 36 on cam profiles 32a, 32b to move the hinged member 12 to or from the closed position 38. In the closed position, the hinged member 12 bears on the device housing 14 to prevent further movement.

Referring now to FIGS. 7–9 and 12, a second embodiment of a hinge 110 in accordance with the present invention is shown. The hinge 110 is similar in construction to the hinge 10 and includes a first hinge part 120 with a cam follower 124 having contacts 126 and 128, a second hinge part 130 which includes a cam surface 132, and a viscoelastic damping fluid 190 interspersed in a gap 192 between the inner surfaces 154, 156 of the first and second hinge parts 120, 130 and the outer surface of the pin 160. The first and second hinge parts 120, 130 are preferably identical, with each including a shaped, circumferentially extending surface on one end face. The circumferentially extending surfaces are matingly engaged with each other by the first hinge part 120 being displaced about axis 122 relative to the second hinge part 130 in a first position. The cam follower 124 on the first hinge part 120 presses against a portion of the cam surface 132 on the second hinge part 130. Preferably, contacts 126, 128 on the first hinge part 120 bear on cam surfaces 132a, 132b on the second hinge part 130.

Figure 8:
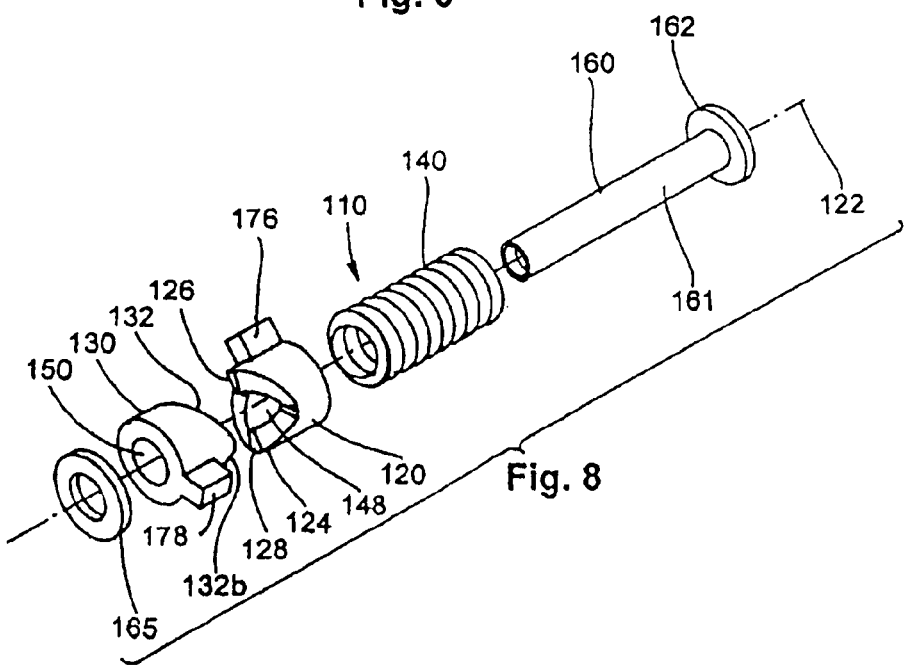
FIG. 8 is an exploded perspective view of the hinge in accordance with the second preferred embodiment of the invention show in FIG. 7.
Figure 7:
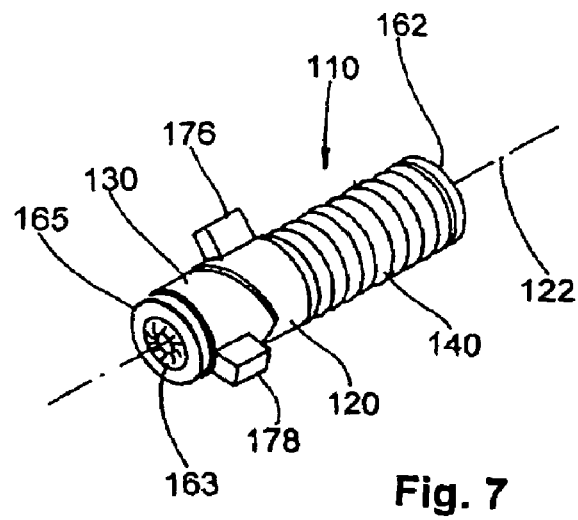
FIG. 7 is a perspective view showing a second preferred embodiment of a hinge in accordance with the present invention.
Figure 12:
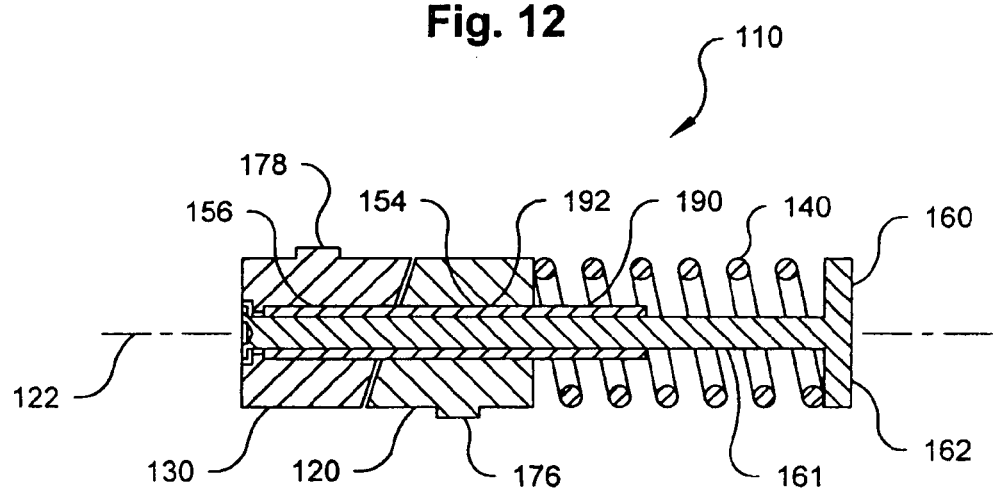
FIG. 12 is a longitudinal cross-sectional view of a hinge in accordance with the second preferred embodiment of the present invention.

As shown in detail in FIGS. 8 and 12, a pin 161 having a first end with a head 162 is provided. The pin 161 acts as an axial load bearing connector, and is inserted through a compression coil spring 140 and axially extending bores 148, 150 in the first and second hinge parts 120, 130, respectively. The viscoelastic fluid 190 is inserted into the gap 192 between the inner surfaces 154, 156 of the bores 148, 150 and the outer surface of the pin 161. However, it is understood by those of ordinary kill in the art from this disclosure that the viscoelastic fluid 190 could be omitted between the inner surface 156 of the second hinge path 130 and the pin 161 since these two parts remain generally statuary with respect to each other. A washer 165 is placed over the second end of the pin 161, and the second end of the pin 161 is crimped over, as shown in FIG. 7, to form the hinge assembly 110.

The viscoelastic fluid 190 is preferably the same as the viscoelastic fluid 90 previously described, and serves to dampen relative movement between the hinge parts 120, 130 and the connector 160 of the hinge 110, and thus opening and closing movement of the hinged member with respect to the device housing (not shown in this embodiment). As in the previous embodiment, the fluid 190 is preferably located in the gap 192 at least throughout the full length of the hinge part 120 and throughout the axial range of motion of the first hinge part 120 along the pin 161.

The first and second hinge parts 120, 130 include a projection 176, 178, which allow the first and second hinge parts 120, 130 to be connected to a hinged member and a device housing (not shown). One of the hinged member and the device housing in which the hinge 110 is to be used includes a slot (not shown) so that one of the projections 176, 178 can be axially displaced during hinge movement. Alternatively, an outer housing (similar to the housing 23 of the first embodiment) can be provided which includes an axial channel in which one of the projections 176 or 178 can slide. The outside of such housing would be anchored in one of the hinged member and the device housing (not shown) in order to prevent wear.

Figure 9:
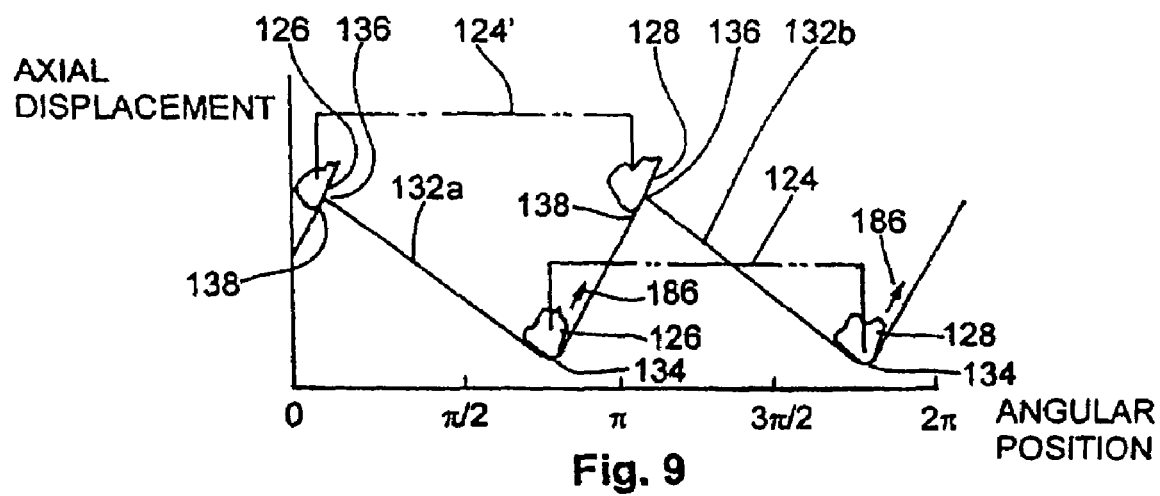
FIG. 9 is a graph showing the axial displacement of the cam surface with respect to angular position for the second preferred embodiment of the hinge shown in FIG. 7.

Referring to FIG. 9, a graph showing the change in axial displacement of the cam surfaces 132a, 132b based on angular position about the axis 122 is provided. In a first position 134, the contacts 126, 128 of the cam follower 124 are located at a lowermost position that corresponds to an open position of the hinge 110, in which a hinged member (not shown) would be open relative to a device housing (not shown). The hinged member can be moved to a closed position, represented by the cam follower 124' with the contacts 126, 128 having passed over a second, uppermost position 136 on the cam surfaces 132a, 132b and dropping down to a third, intermediate position 138. The physical position of the hinged member and device housing in the closed position prevents the contacts 126, 128 from traveling beyond the third, intermediate position. In order to open the hinge 110, an initial force to compress the spring must be overcome prior to the spring 140 expanding and urging the hinge 110 to the open position. The dampening provided by the viscoelastic fluid 190 in the gap 192 slows the motion between each of the cam positions.

In the second embodiment of the hinge 110, the cam follower 124 can over-travel in the direction of arrow 186 from the first position 134 by moving up the transition slopes between the first and second cam surfaces 132a, 132b. While the transition slopes are relatively steep in comparison to the cam surfaces 132a, 132b, they do permit overextension of the first and second hinge parts 120, 130 against the force of the spring 140 which acts to return the first hinge part 120 to the first position relative to the second hinge part 130, as represented by 134.

Preferably, the bores 148, 150 in the first and second hinge parts 120, 130 are sized to provide a slip fit on the pin 161 and to accommodate the fluid 190. This allows partial use of the torsional force of the spring 140 to assist in opening a hinged member (not shown) based on the friction generated between the end face of the spring 140 acting on the abutting face of the first hinged part 120. The torsional force would be proportional to the compressive force being exerted by the spring 140.

Figure 10:
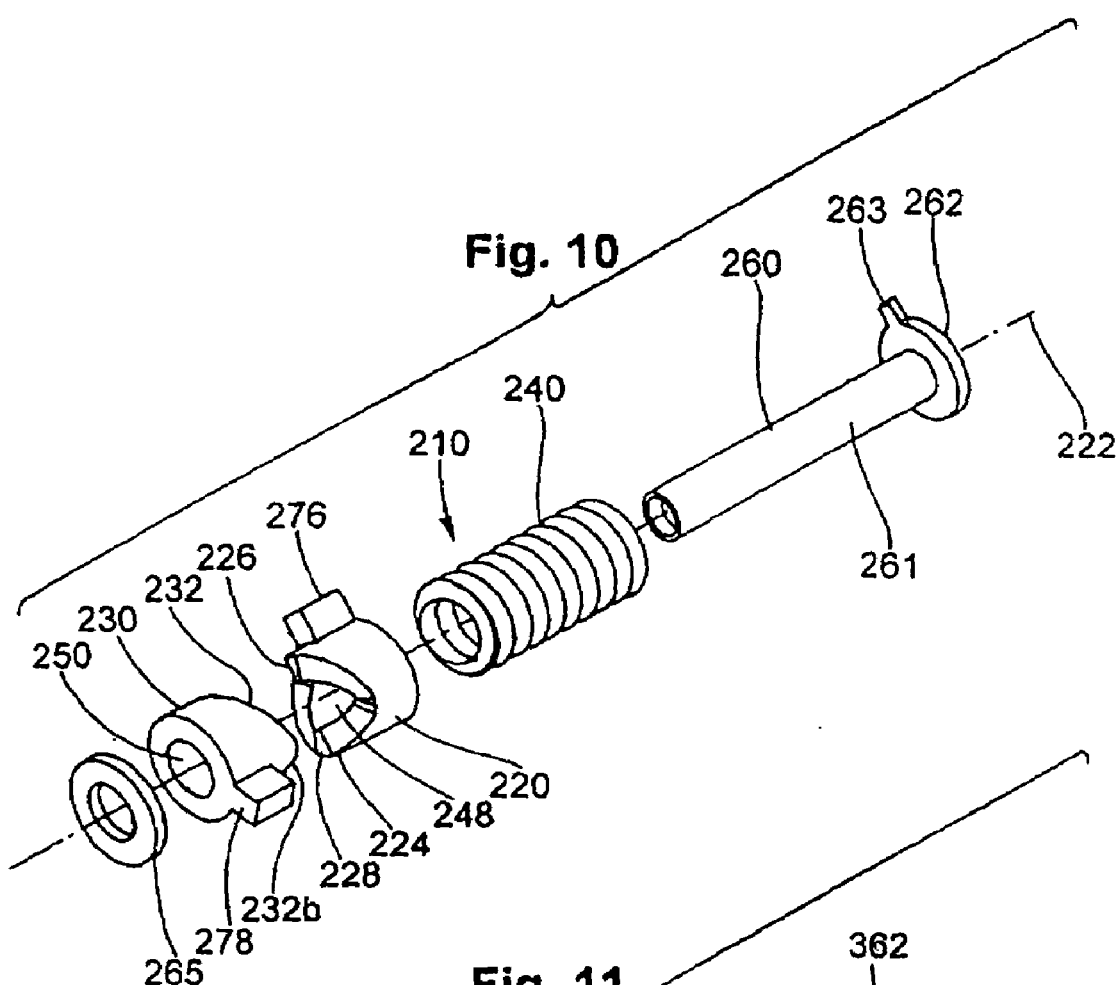
FIG. 10 is an exploded perspective view of a hinge in accordance with a third preferred embodiment of the invention similar to that shown in FIG. 7.

Referring now to FIG. 10, a third preferred embodiment of the invention 210 is shown. The elements of the hinge 210 are similar to the elements of the hinge 110 in accordance with the second embodiment, as described above, and like elements have been identified with like reference numerals with the prefix "2" in place of the prefix "1". For example, the first hinge part 120 of the second preferred embodiment is similar to the first hinge part 220 of the third preferred embodiment. Accordingly, a detailed description of these similar elements has been omitted for the sake of brevity, and the differences between the hinges in accordance with the second and third embodiments of the invention 110, 210 are described in detail below.

In the third preferred embodiment, a tab 263 is provided on the head 262 of the axial connector pin 261. The tab 263 is adapted to be positioned in the same slot in the housing or hinged member as the projection 276. This prevents rotation of the pin 261 relative to the first hinged part 220 in order to eliminate any torsional force which could be applied by the spring 240 to the first hinged member 220.

Figure 11:
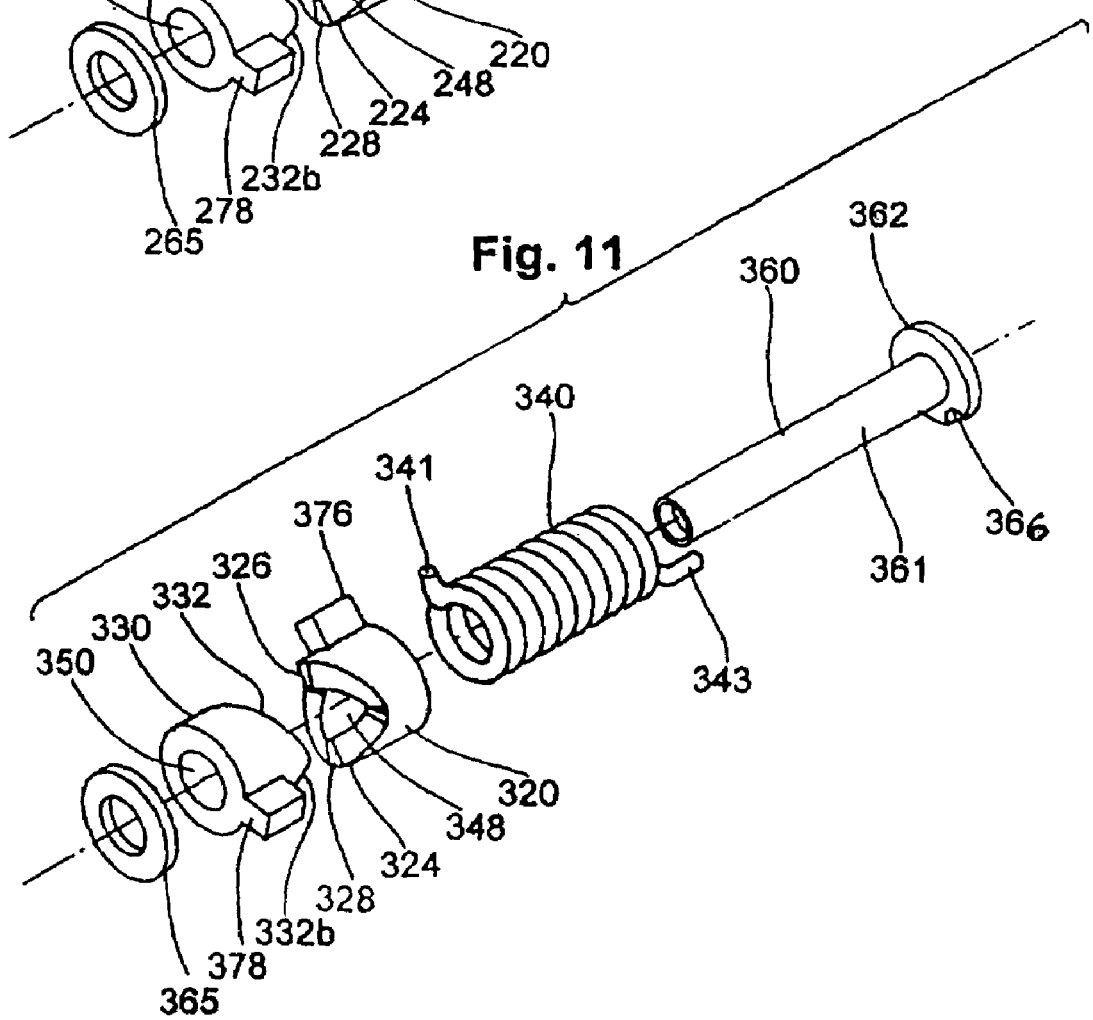
FIG. 11 is an exploded perspective view of a hinge in accordance with a fourth preferred embodiment of the invention similar to that shown in FIG. 7.

Referring now to FIG. 11, a fourth preferred embodiment of the invention 310 is shown. The elements of the hinge 310 are similar to the elements of the hinge 110 in accordance with the second embodiment, as described above, and like elements have been identified with like reference numerals with the prefix "3" in place of the prefix "1". For example, the first hinge part 120 of the second preferred embodiment is similar to the first hinge part 320 in the fourth preferred embodiment. Accordingly, a detailed description of these similar elements has been omitted for the sake of brevity, and the differences between the hinges in accordance with the second and fourth embodiments of the invention 110, 310 are described in detail below.

As shown in FIG. 11, in the fourth preferred embodiment of the invention, the spring 340 includes a projection 341, 343 at each end in order to allow torsional loading and unloading of the spring 340. The projection 341 at the first end of the spring 340 is aligned with and is located in the same slot in the housing or hinged member as the projection 376 of the first hinge part 320. The projection 343 on the second end of the spring 340 is received in a recess 366 of the head 362 of the pin 361. The bore 348 in the first hinge part 320 is sized to form a gap (not shown) between the outer diameter of the pin 361 for receiving damping fluid (not shown). The bore 350 in the second hinge part 330 is sized for a press fit onto the pin 361.

As the second hinge part 330 and an associated hinged member (not shown) are moved relative to the first hinge part 320 located in an associated housing (not shown) toward the closed position, the spring 340 is compressed and loaded torsionally. This provides a minimum holding force in the closed position of the hinge 310 since the torsion force acts in the opening direction against the compression force which acts to maintain the contacts 326, 328 in the third, intermediate position. Upon opening of the hinge 310, as soon as the compressive force of the spring 340 is overcome to move the contacts 326, 328 past the second, uppermost position, the torsional force of the spring 340 combines with the unloading of the compressive force to provide maximum assistance for opening the hinged member attached to the second hinge part 340 relative to the housing attached to the first hinge part 320, under controlled movement from the damping fluid.

Figure 14:
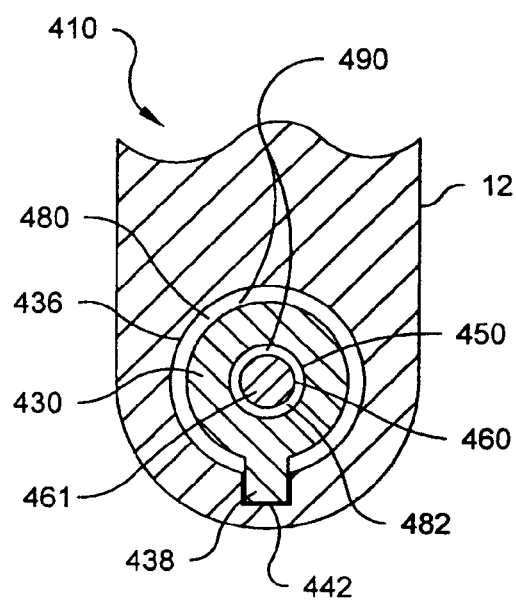
FIG. 14 is a cross-sectional view of the hinge fifth embodiment taken along line 14—14 of FIG. 13.
Figure 13:
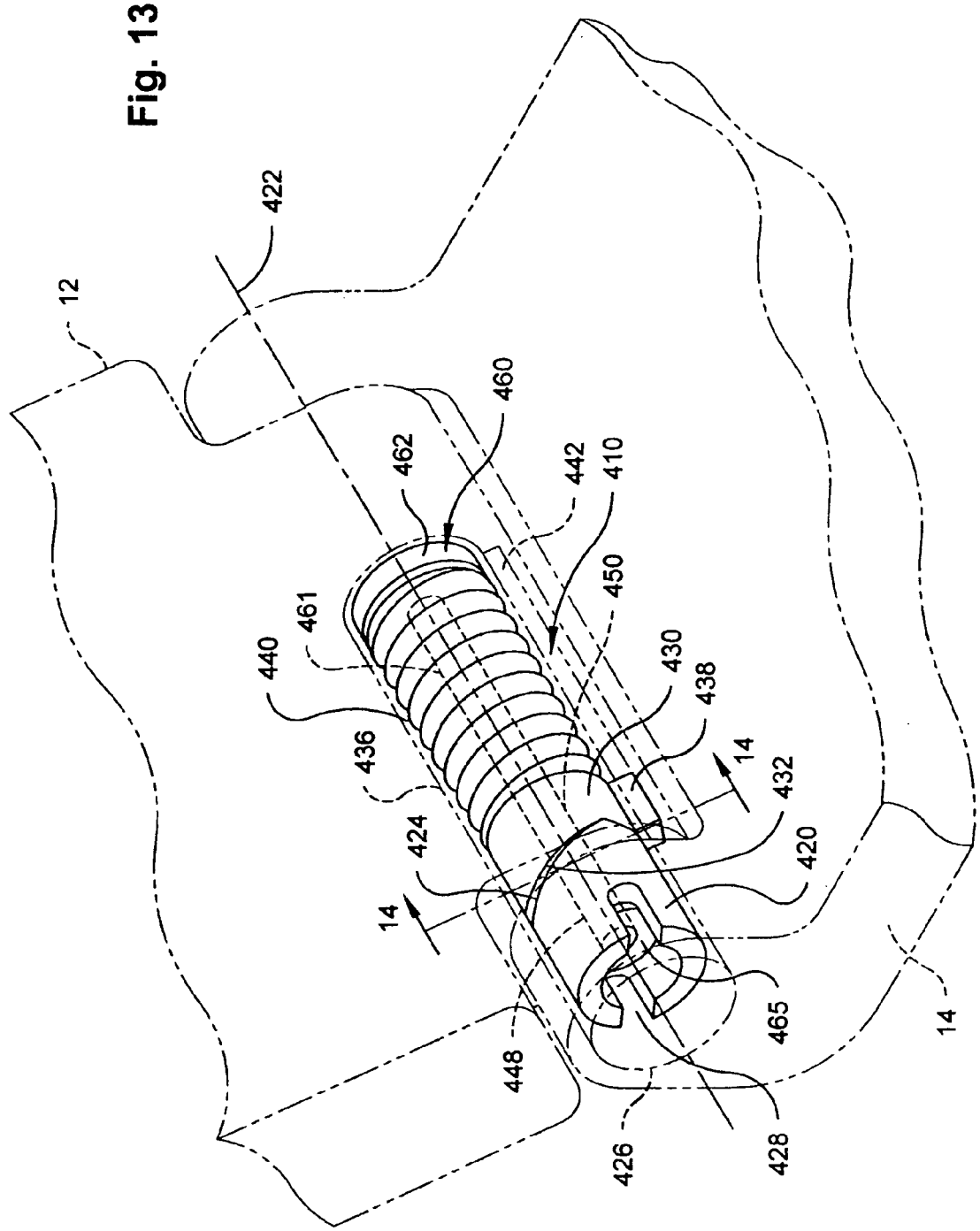
FIG. 13 is a perspective view of the hinge in accordance with a fifth preferred embodiment of the invention.

With reference now to FIGS. 13 and 14, a hinge device 410 in accordance with a fifth preferred embodiment of the invention is illustrated. The hinge device 410 is similar in construction to the previous embodiments, and includes a first hinge part 420 having a longitudinal axis 422 and a second hinge part 430 in the form of a cam follower. The first hinge part 420 is adapted to be connected to one of the hinged member 12 and the device housing 14 (both shown in phantom line), and is preferably adapted to be connected to the device housing 14, while the second hinge part 430 is adapted to be connected to the hinged member 12. As shown, the first hinge part 420 is located within a bore 426 (shown in hidden line) of the device housing 14 and includes a slot 428 through which a pin (not shown) or other interference member of the device housing 14 extends to prevent relative rotational movement between the housing 14 and the first hinge part 420. The second hinge part 430 is slidably positioned within a bore 436 of the hinged member 12 for movement along the longitudinal axis 422. A guide member 438 fits within a slot 442 that extends radially outwardly from the bore 436. The guide member 438 ensures that the second hinge part 430 rotates with the hinged member 12 and travels in a linear direction along the longitudinal axis 422 with respect to the hinged member 12 during mutual rotational movement between the hinged member 12 and the device housing 14. The first hinge part 420 includes a cam surface 424 that contacts a cam follower surface 432 of the second hinge part 430. The cam surface 424 and cam follower surface 432 can be constructed in a manner similar to the embodiments previously described. A biasing member 440, shown here in the form of a compression spring, urges the cam surface 432 against the cam follower surface 424.

An axial load bearing connector 460 extends through the spring 440 and the axial bores 448 and 450 of the first and second hinge parts 420, 430, respectively, to connect the first and second hinge parts 420, 430 together. The force of the spring 440 is reacted in the axial load bearing connector 460 such that no axial load is imparted by the hinge assembly 410 to the hinged member 12 or device housing 14 after assembly. As in the previous embodiments, the axial load bearing connector 460 is preferably in the form of a pin 461 which includes first and second ends. A head 462 is located on the first end and serves as a support for the spring 440. A washer 465 or the like is placed over the second end of the pin 461 and secured thereto by crimping or other well-known fastening means.

As shown in FIG. 14, an outer generally annular gap 480 is formed between the inner surface of the bore 436 of the hinged member 12 and the outer surface of the second hinge part 430. An inner generally annular gap 482 is also formed between the inner surface of the bore 450 of the second hinge part 430 and an outer surface of the pin 461. A viscoelastic damping fluid 490, preferably similar to the viscoelastic damping fluid 90 previously described, is located within the annular gaps 480 and 482. With this arrangement, relative rotational movement between the device housing 14 and the hinged member 12 can be damped and/or controlled to a greater extent than with the previously described embodiments. The amount of dampening provided by the viscoelastic fluid 490 is proportional to the surface area that the fluid 490 contacts. The surface area of the outer surface of the cam and the inner surface of the sleeve would be greater than that of just the outer surface of the pin 161 and inner surface of the cam of the embodiments described above. Thus, by using viscoelastic fluid 490 in both gaps 480, 482 increased dampening can be achieved.

Figure 15:
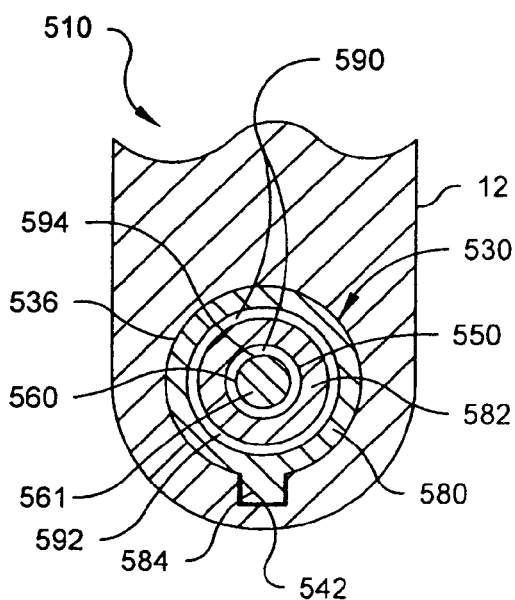
FIG. 15 is a cross-sectional view of a hinge in accordance with a sixth preferred embodiment of the invention similar to that shown in FIG. 14.

With reference now to FIG. 15, a cross section of a hinge device 510 in accordance with a sixth preferred embodiment of the invention is illustrated. The elements of the hinge 510 are similar to the elements of the hinge 410 in accordance with the fourth embodiment, as described above, and like elements have been identified with like reference numerals with the prefix "5" in place of the prefix "4". Accordingly, a detailed description of these similar elements has been omitted for the sake of brevity.

The hinge device 510 is somewhat similar in construction to the hinge device 410 and includes a second hinge part 530 with a housing 580 and a cam follower 582 that is movably located within the housing 580. The cam follower 530 is preferably similar in shape to the second hinge part 430 previously described, but may alternatively be shaped as in the FIG. 4 embodiment. In this alternative embodiment, the inside surface of the housing 580 would be complementary in shape. An outside surface of the housing 580 and inside surface of the hinged member bore 536 may also be complementary in shape similar to the FIG. 4 embodiment. As shown in FIG. 15, the housing 580 includes a guide member 584 that fits within a radially outwardly extending slot 542 of the bore 536. The guide member 538 ensures that the cam follower 530 travels in a linear direction along a longitudinal axis of the bore 536 during mutual rotational movement between the hinged member 12 and the device housing 14.

An outer generally annular gap 592 is formed between the inner surface of the housing 580 and the outer surface of the cam follower 582. An inner generally annular gap 594 is also formed between the inner surface of the bore 550 of the cam follower 582 and an outer surface of the pin 561. A viscoelastic damping fluid 590, preferably similar to the viscoelastic damping fluid 90 previously described, is located within the annular gaps 592 and 594. With this arrangement, the damping fluid 590 can be completely contained and/or sealed within the hinge device 510 so that it is only necessary to install the hinge device into the bores of the hinged member 12 and the device housing 14 relative rotational movement between the device housing 14 and the hinged member 12 can be damped and/or controlled, to a greater extent than with the previously described embodiments. It will be understood that a gap between the device housing 14 and the hinge 410, and/or a gap between the first hinge part 430 and the pin 461 can also or alternatively be formed for accommodating the viscoelastic damping fluid 490.

In the preferred embodiments 10, 110, 210, 310, 410, and 510, the hinged member is preferably held in an open position between 130° and 160° relative to the device housing. This is especially useful for radio or cellular phones. However, it will be recognized by those skilled in the art from the present disclosure that the angular opening displacement can be designed to be at any desired angle, and the present invention is not limited to a particular opening angle.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A hinge adapted to pivotably connect a hinged member to a device housing and being adapted to maintain the hinged member in one of an open position and a closed position relative to the device housing and dampen movement of the hinged member during movement between the closed and open positions, the hinge comprising:

a first hinge part having an axis and a first cam surface, the first hinge part being adapted to be connected to one of the hinged member and the device housing;

a second hinge part aligned with and rotatable about the axis of the first hinge part, the second hinge part having a second cam surface in engagement with the first cam surface, the first and second cam surfaces being arranged to drive at least a portion of one of the first and second hinge parts along the axis of the first hinge part;

a biasing member for biasing the first and second cam surfaces together;

a connector extending through axial bores of the first and second hinge parts, the connector having first and second ends to secure the first and second hinge parts therebetween;

a gap formed between the axial bore of the second hinge part and the connector; and a damping fluid located within the gap for controlling movement of the second hinge part between the closed and open positions by damping axial and rotational movement of the second hinge part relative to the connector.

2. A hinge for controlling a pivotal rate of movement, the hinge comprising:

a first hinge part including an axial bore and a first cam surface;

a second hinge part including an axial bore and a second cam surface and being pivotally mounted to the first hinge part for movement to and between open and closed positions;

a connector extending along an axis, the first and second hinge parts being pivotally mounted on their axial bores around the connector on the axis;

a gap defined between the axial bore of at least one of the first and second hinge parts and the connector; and a damping fluid located within the gap for controlling a relative rate axial and rotational of movement of one of the first and second hinge parts between the open and closed positions.

3. A hinge for controlling a pivotal rate of movement, the hinge comprising:

a first hinge part having a first cam surface;

a second hinge part having a second cam surface in engagement with the first cam surface and being pivotally mounted to the first hinge part for movement to and between open and closed positions;

a connector extending along an axis, the first and second hinge parts being mounted around the connector on the axis and the second hinge part being rotatable and axially movable relative to the connector, the connector, first hinge part and second hinge part being positioned in a bore; and a damping fluid being located within the bore such that the damping fluid is in contact with at least an outer surface of the second hinge part to control a rotational and axial movement of the second hinge part relative to the connector as the hinge moves between the open and closed positions.

4. The hinge of claim 3 wherein the bore is formed in a hinged member of a cellular telephone.

5. The hinge of claim 3 further comprising:

a first gap defined between the second hinge part and the connector; and a second gap defined between the second hinge part and a surface of the bore, the damping fluid being located within the first and second gaps.

* * * * *